US011710055B2

(12) United States Patent
Lin et al.

(10) Patent No.: US 11,710,055 B2
(45) Date of Patent: *Jul. 25, 2023

(54) PROCESSING MACHINE LEARNING ATTRIBUTES

(71) Applicant: PayPal, Inc., San Jose, CA (US)

(72) Inventors: Ying Lin, Shanghai (CN); Huagang Yin, Shanghai (CN); Jiaqi Zhang, Shanghai (CN)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,480

(22) Filed: Feb. 25, 2022

(65) Prior Publication Data

US 2022/0180231 A1 Jun. 9, 2022

Related U.S. Application Data

(63) Continuation of application No. 15/296,520, filed on Oct. 18, 2016, now Pat. No. 11,301,765.

(51) Int. Cl.
*G06Q 20/40* (2012.01)
*G06N 5/045* (2023.01)

(52) U.S. Cl.
CPC ........ *G06N 5/045* (2013.01); *G06Q 20/4016* (2013.01)

(58) Field of Classification Search
CPC ............................ G06N 5/045; G06Q 20/4016
USPC ......................................................... 706/12
See application file for complete search history.

(56) References Cited

U.S. PATENT DOCUMENTS

| 9,185,095 | B1 | 11/2015 | Moritz et al. |
| 2002/0099649 | A1 | 7/2002 | Lee et al. |
| 2005/0125339 | A1 | 6/2005 | Tidwell et al. |
| 2007/0228148 | A1 | 10/2007 | Rable |
| 2009/0024499 | A1 | 1/2009 | Ribble |

(Continued)

FOREIGN PATENT DOCUMENTS

| WO | 2016160539 A1 | 10/2016 |
| WO | 2016164680 A2 | 10/2016 |

OTHER PUBLICATIONS

Khoshgoftaar, et al. "A comparative study of iterative and non-iterative feature selection techniques for software defect prediction", Inf Syst Front (2014) 16:801-822 (Year: 2014).*

(Continued)

*Primary Examiner* — Tsu-Chang Lee
(74) *Attorney, Agent, or Firm* — Haynes and Boone, LLP (57) ABSTRACT

Systems and methods for processing machine learning attributes are disclosed. An example method includes: identifying a user transaction associated with a set of transaction attributes and a first transaction status; selecting, based on a risk evaluation model, a first plurality of transaction attributes from the set of transaction attributes; modifying a first value of a first transaction attribute in the first plurality of transaction attributes to produce a first modified plurality of transaction attributes; determining, based on the risk evaluation model, that the first modified plurality of transaction attributes identify a second transaction status different from the first transaction status; and in response to the determining, identifying the first transaction attribute as a risk attribute associated with the user transaction.

20 Claims, 6 Drawing Sheets

(56) References Cited

U.S. PATENT DOCUMENTS

| | | | |
|---|---|---|---|
| 2012/0109821 A1* | 5/2012 | Barbour | G06Q 40/02 |
| | | | 705/44 |
| 2012/0203708 A1 | 8/2012 | Psota et al. | |
| 2013/0144786 A1* | 6/2013 | Tong | G06Q 20/4016 |
| | | | 705/44 |
| 2013/0231974 A1 | 9/2013 | Harris et al. | |
| 2013/0332338 A1 | 12/2013 | Yan et al. | |
| 2014/0344186 A1* | 11/2014 | Nadler | G06Q 10/067 |
| | | | 705/36 R |

OTHER PUBLICATIONS

Chun H., et al., "Sparse Partial Least Squares Regression for Simultaneous Dimension Reduction and Variable Selection", Journal of the Royal Statistical Society, 2010, vol. 72, Part 1, 23 pages.
International Appl. No. PCT/US2017/054178, International Search Report and Written Opinion dated Jan. 29, 2018, 11 pages.
International Preliminary Report on Patentability for Application No. PCT/US2017/054178 dated May 2, 2019, 8 pages.
Khoshgoftaar T.M., et al., "A Comparative Study of Iterative and Non-Iterative Feature Selection Techniques for Software Defect Prediction", 2014, Inf Syst Front (2014), vol. 16, pp. 801-822.

* cited by examiner

PROCESSING MACHINE LEARNING ATTRIBUTES

CROSS REFERENCE TO RELATED APPLICATIONS

The present application is a continuation application of U.S. patent application Ser. No. 15/296,520, filed Oct. 18, 2016, and is incorporated in reference in its entirety.

TECHNICAL FIELD

The present disclosure relates generally to machine learning, and in particular, to processing machine learning attributes.

BACKGROUND

Entities transacting with users often delay or deny high risk transactions to avoid potential loss. For example, an attempted transfer of computer files to an unregistered user device may suggest that the file transfer is unauthorized, and an attempted user authentication on a desktop computer having a never-seen-before IP address may indicate that the user authentication is fraudulent.

When delaying or denying such a transaction, a merchant often does not provide any specific explanation to a user attempting the transaction. For example, an online merchant may not inform a user why her purchase request made using a friend's computer and the friend's payment account was denied unless the user calls into the merchant's customer support center to inquire.

Because transaction delays or denials are determined based on risk calculations using one or more risk evaluation models, investigating on which basis a transaction was denied or delayed may therefore require querying a risk determination model. A risk determination model, however, may employ hundreds or even thousands of variables. It can therefore be time- and resource-consuming (e.g., may take days and several computing servers) to identify specific reasons for a transaction denial. Also, a merchant's customer support team may have to relay customer inquiries to and rely on a risk assessment team, as the support team may not possess the technical expertise to query the risk evaluation model themselves. Customer experience may be enhanced when the support staff can articulate a reason in a timely fashion.

There is therefore a need for a device, system, and method, which processes user queries of machine learning attributes and returns query results with reasonable certainty and within a predefined time frame.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for selecting machine learning attributes and modifying the values thereof to detect whether a particular attribute may have contributed to a transaction denial or delay.

To determine the basis on which a user transaction is denied (or delayed), in some implementations, a computing system may first compare transaction attributes (e.g., the total payment amount, the payment method used, and the IP address of the user device on which the transaction was requested) with training data attributes (the transaction attributes that were used to construct a risk evaluation model against which the user is querying) to identify matching transaction data attributes. This comparison process may narrow down the identification of relevant attributes from hundreds or thousands of attributes used in the risk assessment model to a few hundred matching attributes.

The computing system may then modify the values of the selected transaction attributes to produce modified transaction data, for example, changing the network location of the user device used to request the user transaction from an unverified VPN address (e.g., 225.225.0.1) to a verified non-VPN address (e.g., 168.42.122.964) or changing the total transaction amount (e.g., from $100 to $20).

The computing system next feeds the modified transaction data to the risk evaluation model to evaluate the risk level of the modified transaction (as represented by the modified transaction data); the risk evaluation model, in turn, determines whether the modified transaction is a high risk transaction or not and approves or denies the modified transaction according to the determination. The processing for modifying the attribute values is also referred to as "tweaking" the transaction data.

The computing system may perform a predefined number of tweaks (e.g., twenty) and determine which one or more tweaks result in a predefined amount of change in the risk assessment determinations (e.g., a risk score reduction from 100 to 20 or from a transaction denial to a transaction approval). The tweaking process may narrow the suspect transaction attributes, from a few hundred, down to ten to twenty highly suspicious attributes. The computing system (or a customer support person with ordinary level of expertise) may identify, from the ten to twenty attributes, which attributes were the factors that resulted in the original transaction denial. In some implementations, a web-based user interface is also provided so that the customer support team can query a risk evaluation data model without requiring involvement from the risk assessment team.

The systems and methods described in the present disclosure can provide a variety of technical advantages. First, data processing efficiencies are enhanced. For example, entities that conduct risk assessment for user transactions (e.g., file transfers, user authentication, and payments) may identify specific reasons for transaction denials (or delays) by processing a reduced number of transaction attributes, thereby consuming less computing resources.

Second, data security is enhanced. The risk evaluation process and the transaction attributes involved need not be revealed or otherwise made known to the user making an inquiry. Instead, transaction data are selected from a transaction database and modified automatically, and suspect transaction attributes can be identified even without a user's involvement.

Third, user experience is enhanced. For example, a user (or a customer support person) who is without expert or technical knowledge can, through a user interface, indirectly query a risk evaluation model and determine, with reasonable certainty and in a timely fashion, which data attributes triggered negative determinations by the risk evaluation model.

Additional details of implementations are now described in relation to the Figures.

Figure 1:
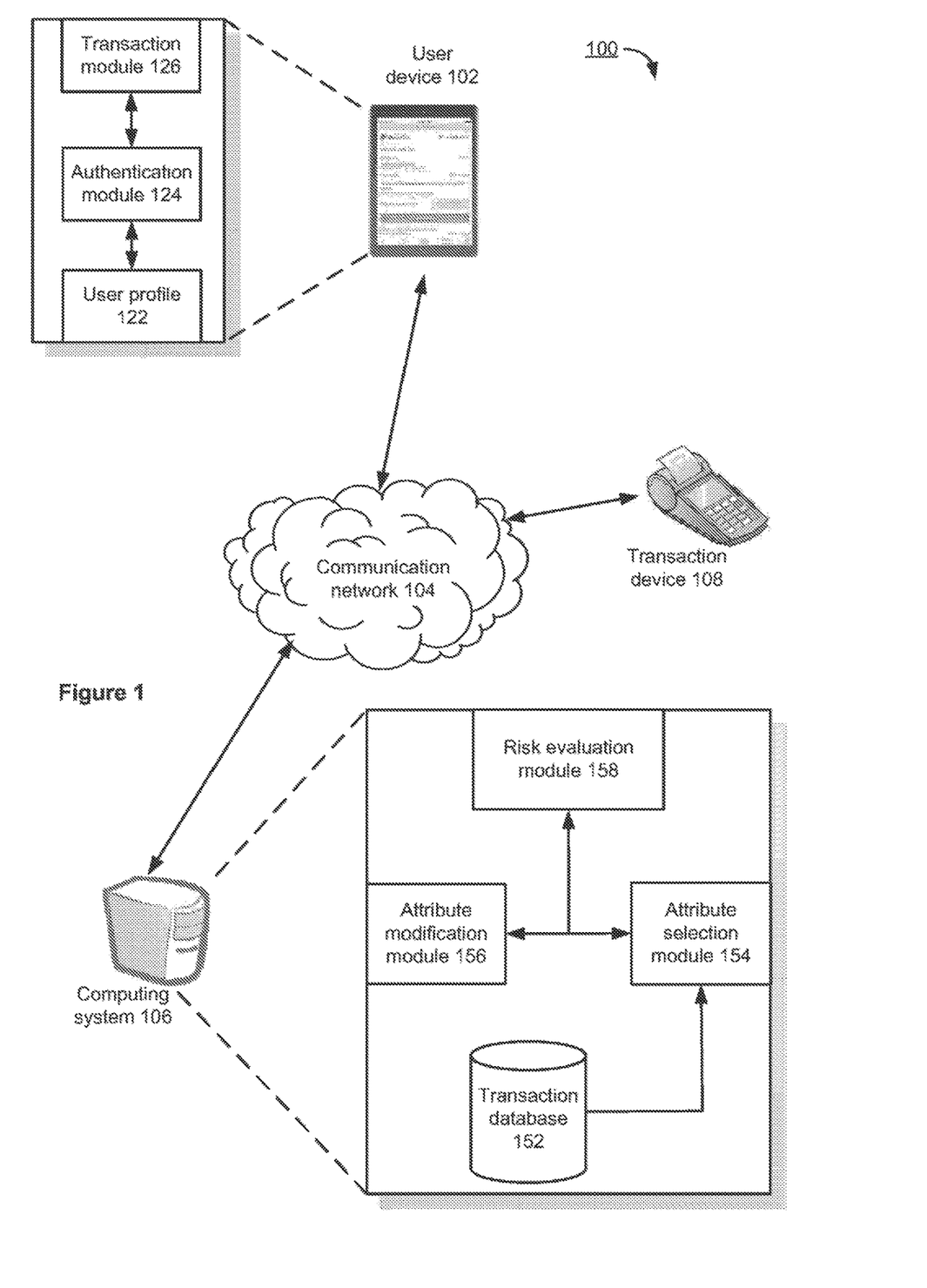
FIG. 1 is a schematic view illustrating an embodiment of a system for selecting machine learning attributes and modifying the values thereof to determine whether an attribute contributed to a transaction denial or delay.

FIG. 1 is a schematic view illustrating an embodiment of a system 100 for selecting machine learning attributes and modifying the values thereof to determine whether an attribute contributed to a transaction denial or delay. The system 100 may comprise or implement a plurality of servers and/or software components that operate to perform various technologies provided in the present disclosure.

As illustrated in FIG. 1, the system 100 may include a user device 102, a computing system 106, and a transaction device 108, in communication over a communication network 104. In the present disclosure, a user device may be, but not limited to, a mobile payment device, a smartphone, a laptop computer, a notebook computer, a mobile computer, a wearable computing device, or a desktop computer.

In one embodiment, the user device 102, after a successful user authentication, enables a user to transact with another computing device, e.g., a merchant's inventory database, a merchant's online order management system, or another user's smartphone. For example, the user device 102 may enable a user to transfer a computer file to a file-sharing web server or to initiate a payment to another user's smartphone.

In one embodiment, the user device 102 collects authentication information from a user and determines, based on the authentication information, whether to successfully authenticate the user on the user device 102 or in one or more software applications (or apps) installed thereon (e.g. a payment app, a ride-sharing app, and an online purchase app). The authentication information may include login credentials (e.g., a user name, a password, and a personal identification number (PIN)). Once a user is successfully authenticated, the user device 102 enables the user to conduct one or more transactions (e.g., making a payment for purchasing an item and receiving a payment for selling an item) using the user device 102.

In one embodiment, the user device 102 stores a user profile 122, which may include information identifying a user whose account is active (e.g., whose account has been logged in) on the user device 102 or in a software application (or app) installed on the user device 102.

The user profile 122 may include one or more transaction attributes relating to a user associated with a user transaction. The user profile 122, for example, may include user account information (e.g., an account number, a user name and the corresponding password, and a PIN), a frequent login location for identifying a location at which a user frequently logs in a user account (e.g., 10 times within 72 hours from Foster City, the State of California, USA), and an account registration location 422 for identifying a location at which a user account was initially registered or enrolled (e.g., the city of Shanghai, China). The user profile 122 may additionally include a user's full legal name, home address, billing address, preferred shipping address, and date of birth. The user profile 122 may be used to determine the potential risk level of a user transaction. For example, if a user profile indicates that the user resides in the City of New York and a refrigerator is purchased from the user's online account and requested to be physically delivered to the City of San Francisco, the online purchase may be a fraudulent transaction.

In one embodiment, the user device 102 may also include an authentication module 124 and a transaction module 126. The authentication module 124 may authenticate a user on the user device 102 as well as in one or more software applications (or apps) installed on the user device 102 using one or more authentication means. In one embodiment, the authentication module 124 may authenticate a user based on a user name and the corresponding password. In another embodiment, the authentication module 124 may authenticate a user (e.g., in a payment app) using Fast IDentify Online (FIDO) technologies. The password-less FIDO technology is supported by the Universal Authentication Framework (UAF) protocol. In some embodiments, a user registers her device to the online service by selecting a local authentication mechanism such as swiping or scanning a finger, looking at the camera, speaking into the microphone, entering a PIN, etc. The UAF protocol allows the online service to select which mechanisms are presented to the user.

The transaction module 126 may initiate a user transaction involving the user device 102, the transaction device 108, the computing system 106, or a combination thereof. The transaction module 126 may, for example, request a file transfer between two user devices, request a download of an order history from a merchant's order management server to a user device, or request a fund transfer from one user's account to another user's account.

In one embodiment, the communication network 104 interconnects the user device 102, the transaction device 108, and the computing system 106. In some implementations, the communication network 104 optionally includes the Internet, one or more local area networks (LANs), one or more wide area networks (WANs), other types of networks, or a combination of such networks.

In one embodiment, the transaction device 108 (which may also be referred to as a merchant device) includes a device associated with a merchant for processing a transaction with the user device 102. The transaction device 108, for example, may be a Point-Of-Sale (POS) machine, an order or inventory management computing server, or a payment processing system.

In one embodiment, the computing system 106 determines the risk level of a user transaction (or one or more modified versions thereof) and processes the user transaction in accordance with the determined risk level. For example, after receiving a user request for placing an online order with a specific payment instrument (e.g., a credit card that has not been used in the last year), the computing system 106 may evaluate the potential risk of the user purchase, e.g., whether the online purchase is a legitimate order placed by the user, whether the user purchase is made through an authorized user account, and whether the shipping address is a legitimate shipping address of the user (as opposed to a locker box address from which a hacker can pick up fraudulently-obtained merchandise).

In one embodiment, the server system 106 includes a transaction data base 152, an attribute selection module 154, an attribute modification module 156, and a risk evaluation module 158.

In one embodiment, the transaction database 152 stores data relating to one or more user transactions, e.g., a user-provided shipping or billing address, an account number of a user-provided payment instrument, an IP address from which a user has successfully logged into a user account for a predefined number of time (e.g., 5 or more times), the country, state/province, or city information a user provided when first registering a user account, a total transaction amount, whether a user has designated a user device as a trusted device, and the device identifiers (e.g., a phone number, a Media Access Control (MAC) address, an International Mobile Equipment Identity (IMEI) number, or a serial number) of user trusted devices.

The transaction database 152 may further store one or more transaction attributes and their values and provides these attributes and values or a subset thereof to the risk evaluation module 158.

The attribute selection module 154 compares the attributes of a user transaction with the attributes employed by a risk evaluation model and selects a subset of the transaction attributes for risk determination and evaluation. The attribute selection module 154 may select (1) the total transaction amount and (2) a user-selected payment instrument, but (3) not the IP device of the user device the transaction was requested, because the user is a known business traveler that spends 90% of her time travelling around the world (which renders less relevant a risk determination based on the network location of the user device).

The attribute selection module 154 may select transaction attributes based on information specific to a transaction or to the user profile 122, for example, whether an online transaction includes run-of-the-mill merchandise (e.g., dish detergents, as opposed to a newly released high-end smartphone) and whether a user is a known high spender (which may render risk determinations based on transaction amounts less relevant), respectively.

The attribute modification module 156 may modify the values of the transaction attributes selected by the attribute selection module 154 to produce modified transaction data and provide the modified transaction data to the risk evaluation module 156 for risk evaluation.

For example, for a user transaction involving an online purchase of a smartphone for approximately $899 and for delivery to a Post Office (P.O.) mail box address, the attribute modification module 156 may modify the value of the "item purchased" attribute from the "smartphone" to a "refrigerator" and the value of the "delivery method" attribute from a non-signature required P.O. Box delivery to an in-store merchandise pickup. The attribute modification module 156 may then submit the modified transaction values to the risk evaluation module 158 for risk determination.

The risk evaluation module 158 may determine or calculate the risk level of a user transaction based on one or more risk evaluation models. The risk evaluation module 158, for example, may apply different weights to different transaction attributes and calculate the weighted total, which is also sometimes referred to as a risk score. Based on a calculated risk score, the risk evaluation module 158 may deem a user transaction, a high risk transaction or a low risk transaction, and determine whether the user transaction should be denied, delayed, suspended pending further review, or approved.

Figure 2A:
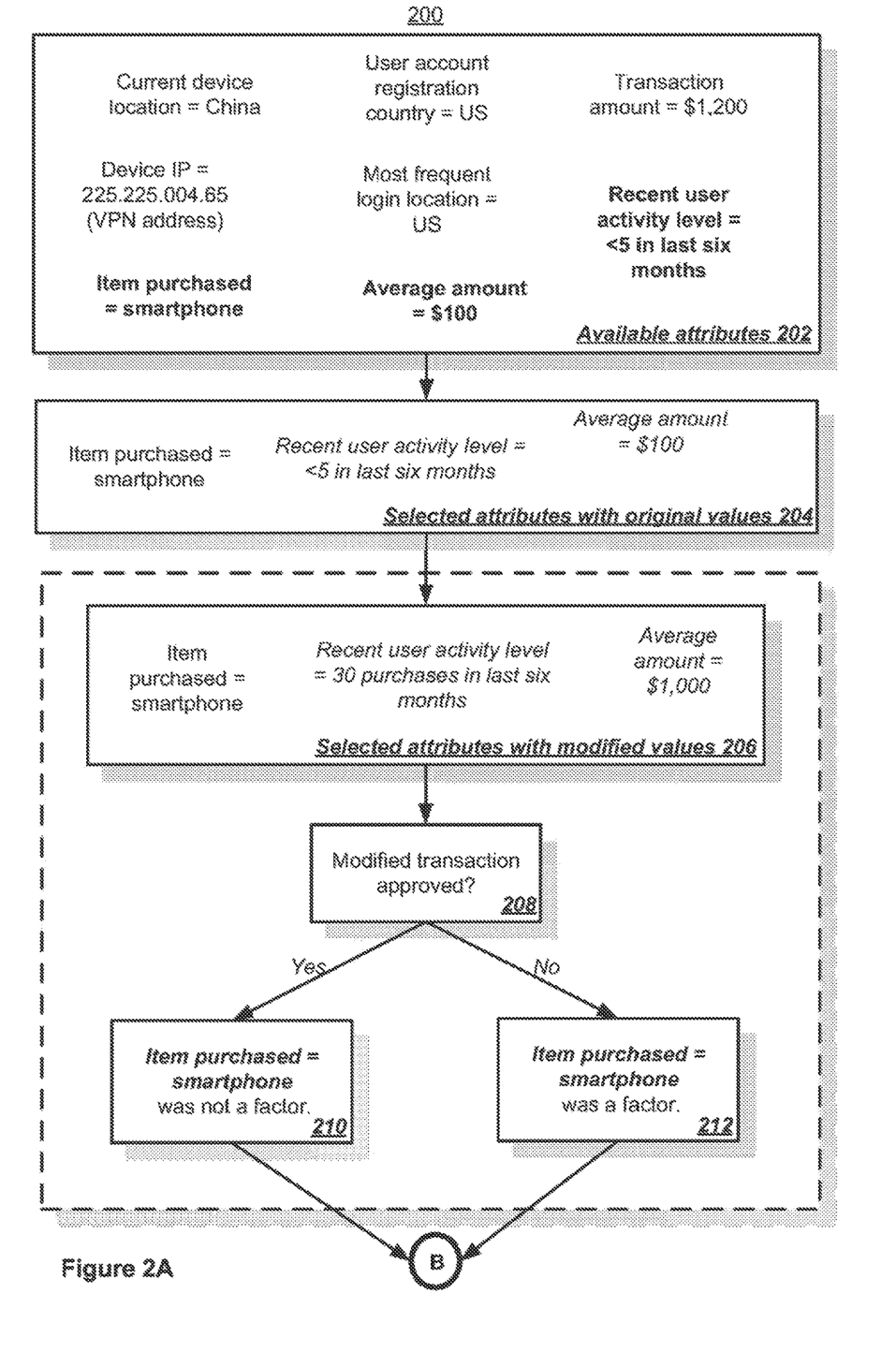
FIG. 2A-2B is a flow chart illustrating an embodiment of a process for selecting machine learning attributes and modifying the values thereof to determine whether an attribute contributed to a transaction denial or delay.
Figure 2B:
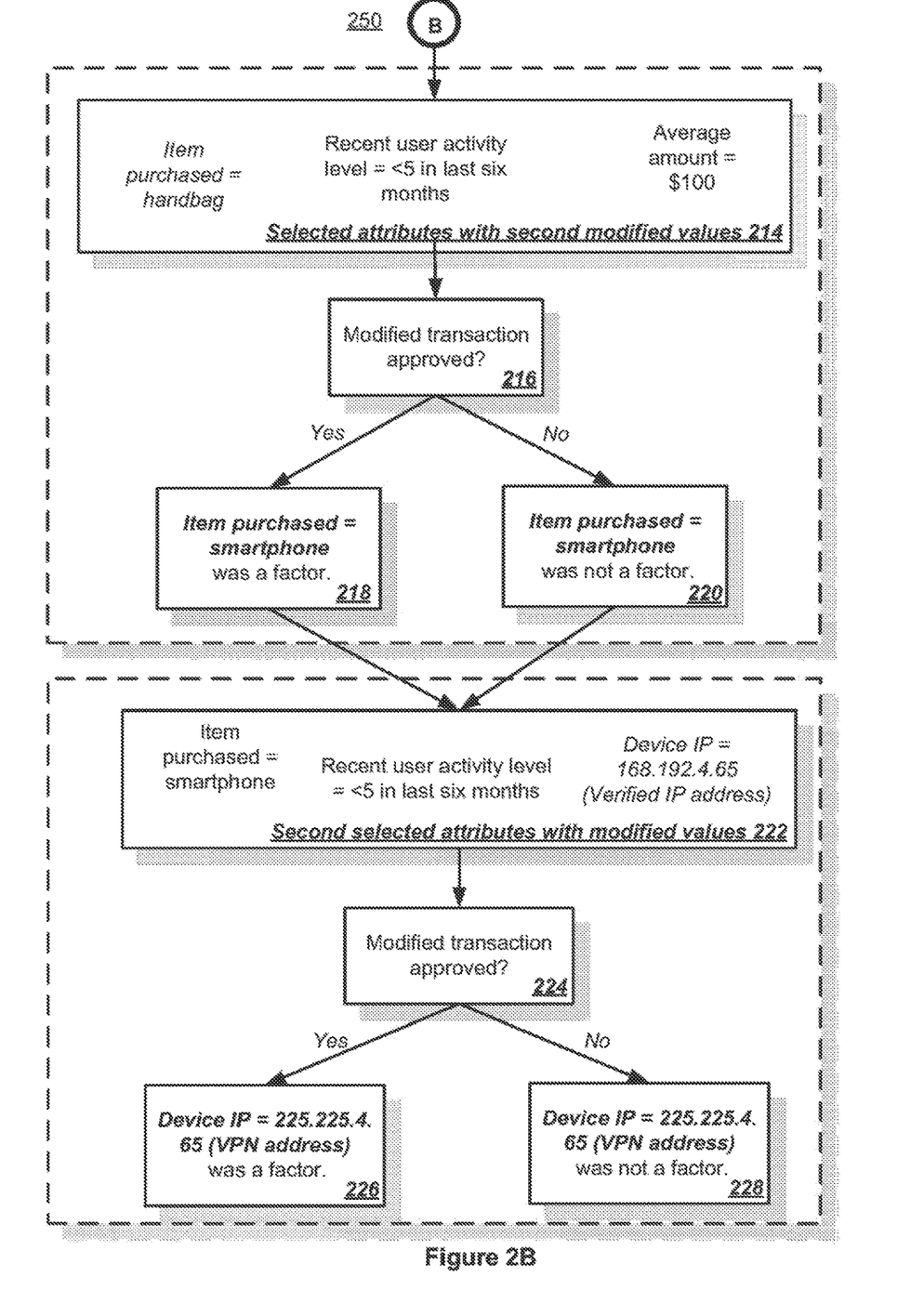

FIG. 2A-2B is a flow chart illustrating an embodiment of a method for selecting machine learning attributes and modifying the values thereof to determine whether an attribute contributed to a transaction denial or delay. The computing system 106, for example, when programmed in accordance with the technologies described in the present disclosure, can perform the method 200.

A user transaction may be described using one or more transaction attributes 202. As shown in FIG. 2A, for example, a user transaction may include an online purchase of a "smartphone" for "$1,200" using a user device currently located in "China" and having the IP address "225.225.004.65," which is an unverified VPN address, and the user transaction is requested from a user account that was first registered in the "United States" and has the most frequent login location also being the "United States" and less than "five user activities in the past six months."

In some implementations, for example, where high values (e.g., 1,000) and high weights (e.g., 0.51) are assigned to an online purchase of a smartphone with the delivery method being a P.O. Box delivery with no photo ID or user signature verification, a risk evaluation model may deem such a user transaction extremely high risk and deny the transaction.

To determine which one or more risk factors (e.g., transactions attributes) contributes to a transaction denial, a computing system may first select a subset of the attributes associated with the denied transaction. In some implementations, the subset includes no more a predefined number of transaction attributes, for example, to ensure that a risk factor investigation process does not exceed more than a predefined amount of response time (e.g., 30 seconds) or does not consume more than a predefined amount of computing resources (e.g., requiring less than 2 minutes of CPU time in total). As shown in FIG. 2A, the attribute selection module 154 may select the subset of attributes 204 from the attributes 202.

To determine which one of these transaction attributes (e.g., an online purchase, the item purchased being an item, or the delivery method being a P.O. Box delivery) contributed (e.g., most or least) to the transaction denial, the computer system 106 may modify the values of one or more of selected transaction attributes and calculate the risk score of the modified transaction.

For example, the attribute modification module 156 may modify the attribute values of the original transaction (an online purchase of a smartphones with a P.O. Box delivery) to produce a modified transaction (e.g., an online purchase of two boxes of soap bars with the delivery method with a P.O. Box delivery, an online purchase of a smartphone with an in-person delivery to a residence registered in the user's account as the user's primary residence, or an online purchase of a smartphone with an in-store pickup that requires a verification of a photo ID and the payment instrument used).

As shown in FIG. 2A, the modified transaction 208 may also include an online purchase of a smartphone made from a user account that has thirty purchase transactions in the last six months and an average transaction amount of $1,000.

The risk evaluation module 158 may then evaluate the risk level of the modified transaction 206 to determine whether the modified transaction can be approved. As shown in FIG. 2A, if the modified transaction is approved, in some implementations, the computing system 106 may determine that the item purchased was not a significant factor (210) that contributed to the denial or the original transaction. In some implementations, a significant factor (or transaction attribute) includes a factor that does not determinatively prevent a transaction from being approved. In some other implementations, a significant factor (or transaction attribute) includes a factor that does not cause a transaction to be denied or delayed for more than a predefined percentage (e.g., 50%) of the time.

Alternatively, if the modified transaction is not approved, in some implementations, the computing system 106 may determine that the item purchased was a significant factor (212) that contributed to the transaction denial. This may be because that the modifications to the other two transaction attributes (e.g., changing the user account information from the user account A that has fewer than 6 user activities in the last six months and an average transaction amount of $100 to the user account B that has thirty purchase transactions in the last six months and an average transaction amount of $1,000) do not change the outcome of the risk evaluation and transaction process—the computing system 106 deems the modified transaction as a high risk transaction and denies the modified transaction.

The computing system 200 may repeat the modification and re-evaluation process for a predefined number of iterations to evaluate a subset or all of the available transaction attributes 202.

During some iterations of the modification and re-evaluation process, the computing system 106 may modify the values of other selected attributes 204. For example, the attribute modification module 156 may change the original transaction (an online purchase of two smartphones with the delivery method being a P.O. Box address delivery) to produce a second modified transaction 216 (e.g., an online purchase of a handbag from a user account that has fewer than six user activities in the last six months, with an average transaction mount of $100).

The risk evaluation module 158 may then evaluate the risk level of the second modified transaction 216 to determine whether the modified transaction 216 can be approved. As shown in FIG. 2A, if the second modified transaction is approved, in some implementations, the computing system 106 may determine that the item being purchased (a smartphone) was a significant factor (218) that contributed to the denial of the original transaction. Alternatively, if the second modified transaction is not approved, in some implementations, the computing system 106 may determine that the original item purchased was not a significant factor (220) that contributed to the transaction denial.

This may be because that the single modification to the transaction attribute "item purchased" may cause a transaction's risk level to change so significantly or determinatively that the original transaction was not approved and the modified transaction is approved.

During some other iterations of the modification and re-evaluation process, the computing system 106 may select another set of transaction attributes 222 (different from the selected attributes 204) and generate modified transactions based on the different transaction attributes 222.

As shown in FIG. 2B, for example, the attribute selection module 154 may select the attributes 222 (e.g., the item purchased attribute, the recent user activity level attribute, and the device IP attribute). The attribute modification module 156 may change the values of the original transaction to produce a modified transaction 224 (e.g., an online purchase of a smartphone from a user account that has fewer than six user activities in the last six months on a user device that has a verified IP address of 168.192.4.65).

The risk evaluation module 158 may then evaluate the risk level of the modified transaction 224 to determine whether the modified transaction 224 can be approved. As shown in FIG. 2B, if the modified transaction 224 is approved, in some implementations, the computing system 106 may determine the factor that the original transaction was requested from a user device with an unverified VPN address of 225.225.4. 65 was a significant factor (226) that contributed to the denial of the original transaction. This may be because an unverified VPN IP address has a high likelihood of being used by an unauthorized user to conduct a fraudulent transaction.

Alternatively, if the modified transaction 224 is not approved, in some implementations, the computing system 106 may determine the factor that the original transaction was requested from a user device with an unverified VPN address of 225.225.4. 65 was not a significant factor (228) that contributed to the denial of the original transaction.

Figure 3:
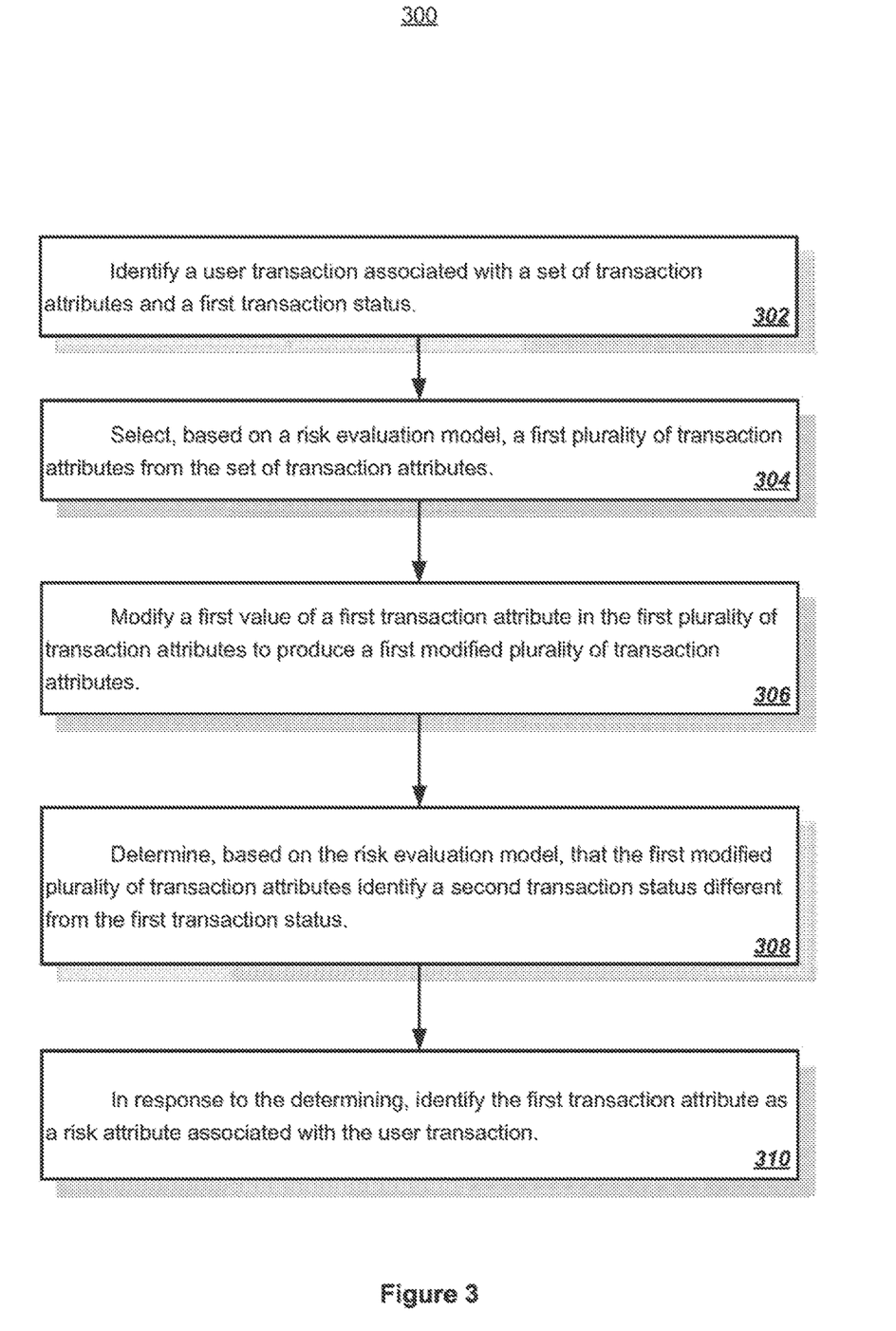
FIG. 3 is a flow chart illustrating an embodiment of a method for selecting machine learning attributes and modifying the values thereof to determine whether an attribute contributed to a transaction denial or delay.

FIG. 3 is a flow chart illustrating an embodiment of a method 300 for selecting machine learning attributes and modifying the values thereof to determine whether an attribute contributed to a transaction denial or delay. The computing system 106, for example, when programmed in accordance with the technologies described in the present disclosure, can perform the method 300.

In some implementations, a risk factor investigation process begins with selecting, from a transaction database, a user transaction with a user-specified status (e.g., a denial), as well as one or more attributes of the user transaction. The method 300 may therefore include identifying (302) a user transaction associated with a set of transaction attributes and a first transaction status. The identifying (302) step may take place in response to an automatic detection of a transaction denial or suspension. For example, the computing system 106 may monitor the output of the risk evaluation module 158 to determine whether a user transaction is approved, denied, delayed, suspended, or pending further view. The computing system 106 may proactively (as opposed to in response to a user inquiry) identify, in response to a determination that a transaction is denied, at least one transaction attribute that may be a factor that contributed to the denial because, when a transaction is denied outright, a user is likely to inquire the reason for the denial and possibly re-initiate the transaction again. The computing system 106 may identify user transactions that are not approved (e.g., denied, delayed, or suspended) based on transaction identifiers (e.g., an order number, a user inquiry number, a user account identifier).

The identifying (302) may also take place in response to a user query of risk attributes. For example, after a transaction is denied, a user may call into a customer support hotline or use a web or email portal to inquire which one or more risk attributes might have contributed to the transaction denial. As part of the query process, the user may identify, to the computing system 106, some suspect transaction attributes in the form of plain-text user narratives (e.g., "one of the items I purchased is a smartphone"; "I used VPN"; "the order was expensive"; "I am out of the country"; and "I used a new phone."). The computing system 106 may apply one or more text parsing and keyword matching techniques to identify keywords from the user-provided narrative (e.g., "item purchased"; "VPN address"; "transaction amount"; "transaction location"; and "device identifier"; respectively). The system-identified keywords may then be used to determine which transaction attributes may be relevant. These techniques are technically advantageous, because when a user transaction is not approved, the user attempting the transaction sometimes has a better sense of why the transaction was not approved. Leveraging a user's knowledge to initially identify suspect risk factors may significantly reduce the complexity of a risk investigation process, reducing the response time and computing resources needed.

The transaction attributes may include one or more characteristics associated with a transaction, one or more characteristics associated with a user or user device, one or more characteristics associated with a merchant or merchant device, and one or more characteristics associated with a user inquiry of risk factor. In some implementation, therefore, the first plurality of transaction attributes comprise at least one of: a transaction amount, a user-registered geographical location, a network location of a user device on which the user transaction is conducted, an item of interest associated with the user transaction, a user transaction frequency level, or an average transaction amount.

A subset of the transaction attributes may be selected, depending on which risk evaluation is to be used. In some implementations, therefore, the method 300 includes selecting (304), based on a risk evaluation model, a first plurality of transaction attributes from the set of transaction attributes. For example, the computing system 106 may select, from several different risk evaluation models, a risk evaluation model relating to user transactions conducted online and selected transaction attributes that are more relevant to online transactions (e.g., the IP address of a user device and the MAC address of the user device).

Different risk evaluation models may be selected for different types of user transactions. For example, a risk evaluation model tailored to the characteristics of online user transactions (e.g., where a physical inspection of a user identification might be difficult, where a physical delivery is likely involved, and where a credit card's number may need to be keyed in as opposed to swiped in) may be selected to evaluate the risks of online transactions, whereas a risk evaluation tailored to the characteristics of in-person user transactions (e.g., where a verification of the authenticity of a user-provided identification might be needed, where a physical delivery is likely not necessary, and where a user can verify the answers to the account security questions in person) may be selected to evaluate the risks of in-person transactions.

The selection (304) of transaction attributes includes comparing transaction attributes descriptive of a transaction with training transaction attributes based at least in part on which selected risk evaluation model was initially or subsequently trained. In some implementations, therefore, if a risk evaluation model has not been trained for risk determination (or evaluation) based on a specific transaction attribute, then when the specific transaction attribute is selected for risk evaluation, the risk model may be disfavored or avoided. Conversely, when the risk model is selected for risk determination, that specific transaction attribute may be disfavored or avoided. These techniques are technically advantageous, as they prevent the selection of an untrained attribute or data model, increasing the accuracy of a risk determination.

After relevant transaction attributes are selected, in some implementations, the computing system 106 may tweak (e.g., modify, change, or revise) the transaction data to generate (or simulated) one or more modified transactions. The method 300 may therefore further include modifying (306) a first value of a first transaction attribute in the first plurality of transaction attributes to produce a first modified plurality of transaction attributes. For example, as explained with reference to FIGS. 2A and 2B, the computing system 106 may modify an original transaction to generate (or simulate) a modified transaction by changing the values of the selected transaction attributes. In some implementations, modifying the first value of the first transaction attribute in the first plurality of transaction attributes may therefore include changing the first value by a predefined amount. For example, in the example explained with reference to steps 206-212, changing the value of the "average amount" from $100 to $101 (or any other insignificant way), for some risk evaluation models, may not produce a meaningful risk evaluation result. In some implementations, therefore, a risk evaluation model may store a minimum value increment/decrement for each stored transaction attribute, so that a transaction attribute modification (tweak) process can produce meaningful results.

In some implementations, the computing system 106 may tweak a limited number of transaction attributes to ensure that the response time needed is less than a predefined amount of time (e.g., 30 seconds, 5 minutes, 8 hours, or 2 business days), e.g., to provide risk factor investigation results to a user in a timely manner. The method 300 may therefore include modifying values of a predefined number of transaction attributes (e.g., 5, 50, 200, or 400) in the first plurality of transaction attributes to produce the first modified plurality of transaction attributes.

In some implementations, the computing system 106 may determine the total number of transaction attributes to be selected for risk factor investigation based characteristics relating to a user inquiry. For example, if the computing system 106 is conducting a risk factor investigation automatically in response to a transaction denial and a user has not inquired about the transaction denial, the computing system 106 may select a relatively large number of transaction attributes (e.g., 2000) and execute the risk factor investigation as part of an overnight batch execution job, as there might not be an urgency in time to produce risk investigation results to a user.

As another example, if the computing system 106 is conducting a risk factor investigation in response to a user's calling into a customer service hotline and the user is awaiting the factor investigation results on the call, the computing system 106 may select a relatively small number of transaction attributes (e.g., 20), as there might be an urgency in time to provide the risk investigation results to the user.

As a third example, if the computing system 106 is conducting a risk factor investigation in response to a user's email or web submission of a risk factor investigation request, the computing system 106 may select a mid-range number of transaction attributes (e.g., 200), as the user might allow a fair amount of wait time (e.g., 5-24 hours). As a fourth example, if the computing system 106 is conducting a risk factor investigation in response to a user communicating with a customer service team via an instant messaging application, the computing system 106 may select a different mid-range number of transaction attributes (e.g., 50), as the user might allow some, but not a great amount of, wait time (e.g., 2-5 minutes).

In some implementations, the computing system 106 may tweak the transaction attributes by selecting several different groups of transaction attributes, generating modified transactions based on each group of transaction attributes, and determining the risk factor for each modified transaction. The method 300 may therefore include selecting, based on the risk evaluation model, a second plurality of transaction attributes from the set of transaction attributes; modifying a second value of a second transaction attribute in the second plurality of transaction attributes to produce a second modified plurality of transaction attributes; determining, based on the risk evaluation model, that the second modified plurality of transaction attributes identify the second transaction status; and in response to the determining, identifying the second transaction attribute as a risk attribute associated with the user transaction. For example, the computing system 106 may select different groups of transaction attributes: the "item purchased" attribute, the "recent user activity level" attribute, and the "average amount" attribute as the first group of transaction attributes as shown in steps 206-212; and the "item purchased" attribute, the "recent user activity level" attribute, and the "Device IP" attribute as the second group of transaction attributes as shown in steps 222-228.

In some implementations, the computing system 106 includes at least one common transaction attribute among the selected different attribute groups. In the above example, the "item purchased" attribute and the "recent user activity level" attribute are the common attributes shared by the first group of attributes and the second group of attributes. Including one or more common attributes across different attribute groups is technically advantageous, because the impact (or lack thereof) of a common attribute can be better determined: a common attribute may be a risk factor, if it leads to the same transaction status, regardless of the presence of other transaction attributes; a common attribute may not be a risk factor, if the transaction status largely depends on the presence of absence of other transaction attributes.

In some implementations, to investigate risk factors over a predefined breadth of transaction attributes, the computing system 106 does not include a common transaction attribute across different attribute groups. For example, the first plurality of transaction attributes and the second plurality of transaction attributes, in some implementation, share no overlapping transaction attributes.

After one or more tweaks, the computing system 106 may identify several attributes whose value changes resulted in a transaction status change (e.g., from a transaction denial to an approval). The method 300 may therefore include determining (308), based on the risk evaluation model, that the first modified plurality of transaction attributes identifies a second transaction status different from the first transaction status. For example, as explained with reference to FIGS. 2A and 2B, the computing system 106 may change (1) the value of the "item purchased" attribute from "smartphone" to "handbag" (the steps 214, 216, and 218) or (2) the value of the "Device IP" attribute from "225.225.4. 65" (a VPN address) to "168.192.4.65" (a verified IP address) (the steps 222, 224, and 226); and the modified transactions are approved (in contrast with the original transaction being denied).

The computing system 106 may deem a transaction attribute whose value change can cause a modified transaction to be approved when the original transaction was denied (or otherwise fail to complete successfully) a relevant risk factor. The method 300 may therefore include, in response to the determining (308), identifying (310) the first transaction attribute as a risk attribute associated with the user transaction. For example, the computing system 106 may determine that the "item purchased" attribute and the "Device IP" attribute are both risk factors.

To protect the security of the risk evaluation model, the computing system may provide the name of the risk factors to a user, but withhold the names of other transaction attributes from the user. The method 300 may therefore include withholding the first plurality of transaction attributes, less the first transaction attribute, from being provided responsive to the user query. These technologies are technically advantageous, because a user may be informed of what is necessary, without sacrificing the sanctity of the risk evaluation model and the details of a risk evaluation process, which reduces risk of design arounds and fraud.

In some implementations, an example method includes: identifying a user transaction having a predefined transaction risk level; selecting, based on a risk evaluation model, a first plurality of transaction attributes associated with the user transaction; modifying a first value of a first transaction attribute in the first plurality of transaction attributes to produce a first modified plurality of transaction attributes; evaluating the first modified plurality of transaction attributes based on the risk evaluation model to determine a modified transaction risk level; determining that a difference between the modified transaction risk level and the predefined transaction risk level is greater than a predefined amount; and in response to the determining, identifying the first transaction attribute as a risk attribute associated with the user transaction.

In some implementation, another example method includes: identifying a user transaction having a predefined transaction risk level; selecting, based on a risk evaluation model, a first plurality of transaction attributes associated with the user transaction; modifying a first value of a first transaction attribute in the first plurality of transaction attributes to produce a first modified plurality of transaction attributes; calculating a modified transaction risk level based on applying the first modified plurality of transaction attributes to the risk evaluation model; determining that a difference between the modified transaction risk level and the predefined transaction risk level is greater than a predefined amount; and in response to the determining, identifying the first transaction attribute as a risk attribute associated with the user transaction.

Figure 4:
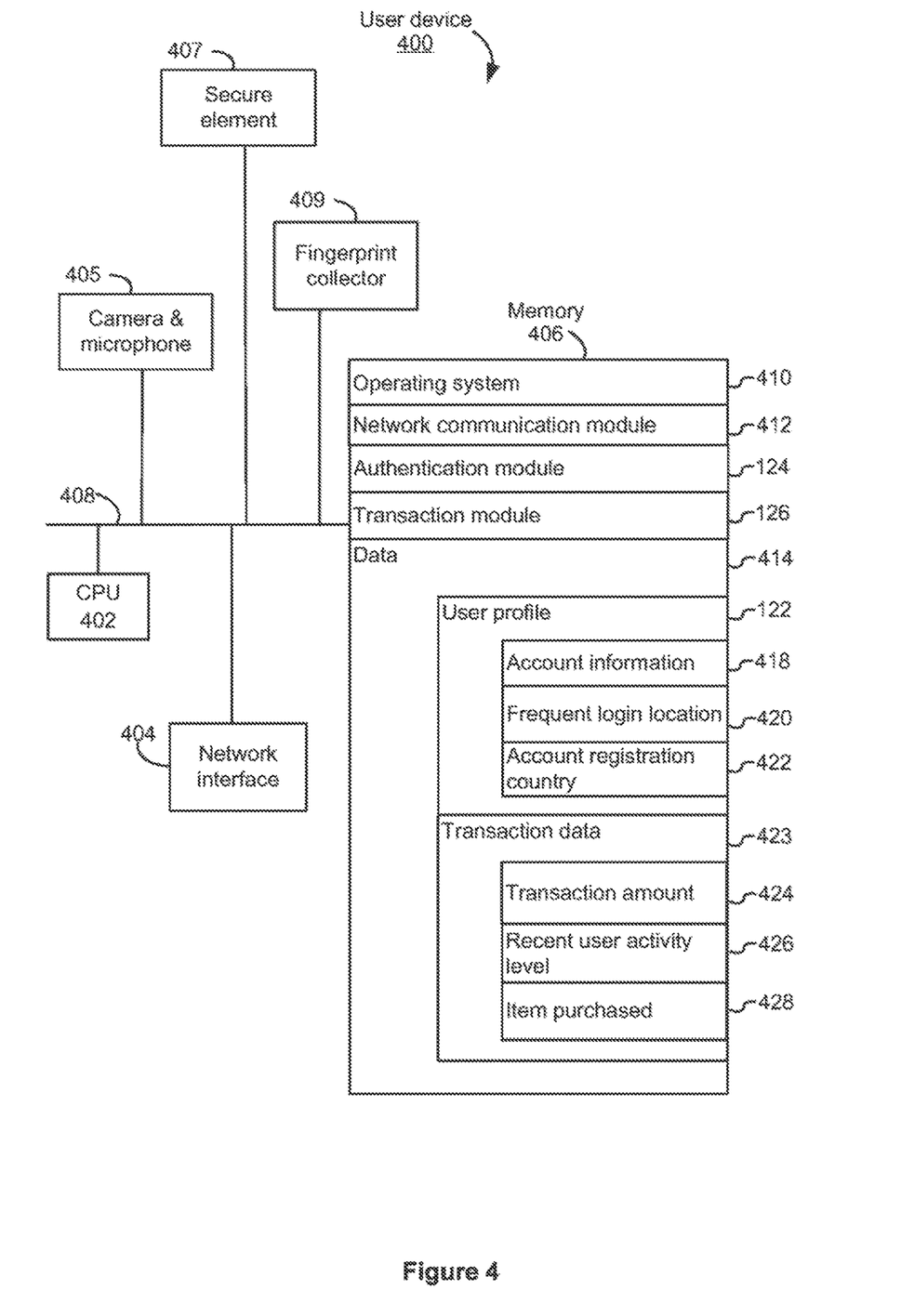
FIG. 4 is a schematic view illustrating an embodiment of a user device.

FIG. 4 is a schematic view illustrating an embodiment of a user device 400, which can be the device 102 shown in FIG. 1. The device 400 in some implementations includes one or more processing units CPU(s) 402 (also referred to as hardware processors), one or more network interfaces 404, a memory 406, and one or more communication buses 406 for interconnecting these components. The communication buses 406 optionally include circuitry (sometimes called a chipset) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

an operating system 410, which includes procedures for handling various basic system services and for performing hardware dependent tasks;

a network communication module (or instructions) 412 for connecting the device 400 with other devices (e.g. the transaction device 108 or the computing system 106) via one or more network interfaces 404 (wired or wireless) or via the communication network 104 (FIG. 1);

an authentication module 124 for authenticating a user on the user device 400 as well as in one or more software application (or apps) installed on the user device 400;

a transaction module 126 for enabling a user to initiate a transaction (e.g., making or receiving a payment) involving the user device 400, the transaction device 108, the computing system 106, or a combination thereof; and data 414 stored on the device 400, which may include:
  the user profile 122 for including information associated with a user, which may include:
    user account information 418, e.g., account number, a user name and corresponding password, and a personal identification number (PIN);
    a frequent login location 420 for identifying a geographical location or a computer network location, at which the user identified in the user profile 416 frequently logs in, e.g., Foster City, the State of California, USA; and the IP address "192.168.24.36"; and
    an account registration location 422 for identifying a geographical location or a computer network location, at which the account identified by the user account information 418 was initially registered or enrolled, e.g., Foster City, the State of California, USA; and the IP address "192.168.24.36"; and
  the transaction data 123 (or a portion thereof), which may include:
    the transaction amount attribute for describing the total monetary amount (e.g., $1,000) of a user transaction;
    the recent user activity level attribute for describing level of user activities (or lack thereof) of a user account from which a user transaction is requested, e.g., the total number of times a user has successfully logged into the user account in the past six months, or the total number of times a user has successfully made a payment using a payment method registered in the user account; total monetary amount (e.g., $1,000) of a user transaction; and
    the item purchased attribute for describing one or more items (e.g., goods or services) a user attempts to purchase.

The device 400 may also include a secure element 407 for storing information identifying one or more payment methods (e.g., account numbers and payment tokens), one or more identification tokens, and user biometric data known to belong to an authorized user. The device 400 may further include a camera and microphone 405 for capturing image and voice data of a user, e.g., a facial feature, a pronunciation, a tattoo, and other distinguishing bodily features of the user, and a fingerprint collector 409.

In some implementations, one or more of the above identified elements are stored in one or more of the previously mentioned memory devices, and correspond to a set of instructions for performing functions described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
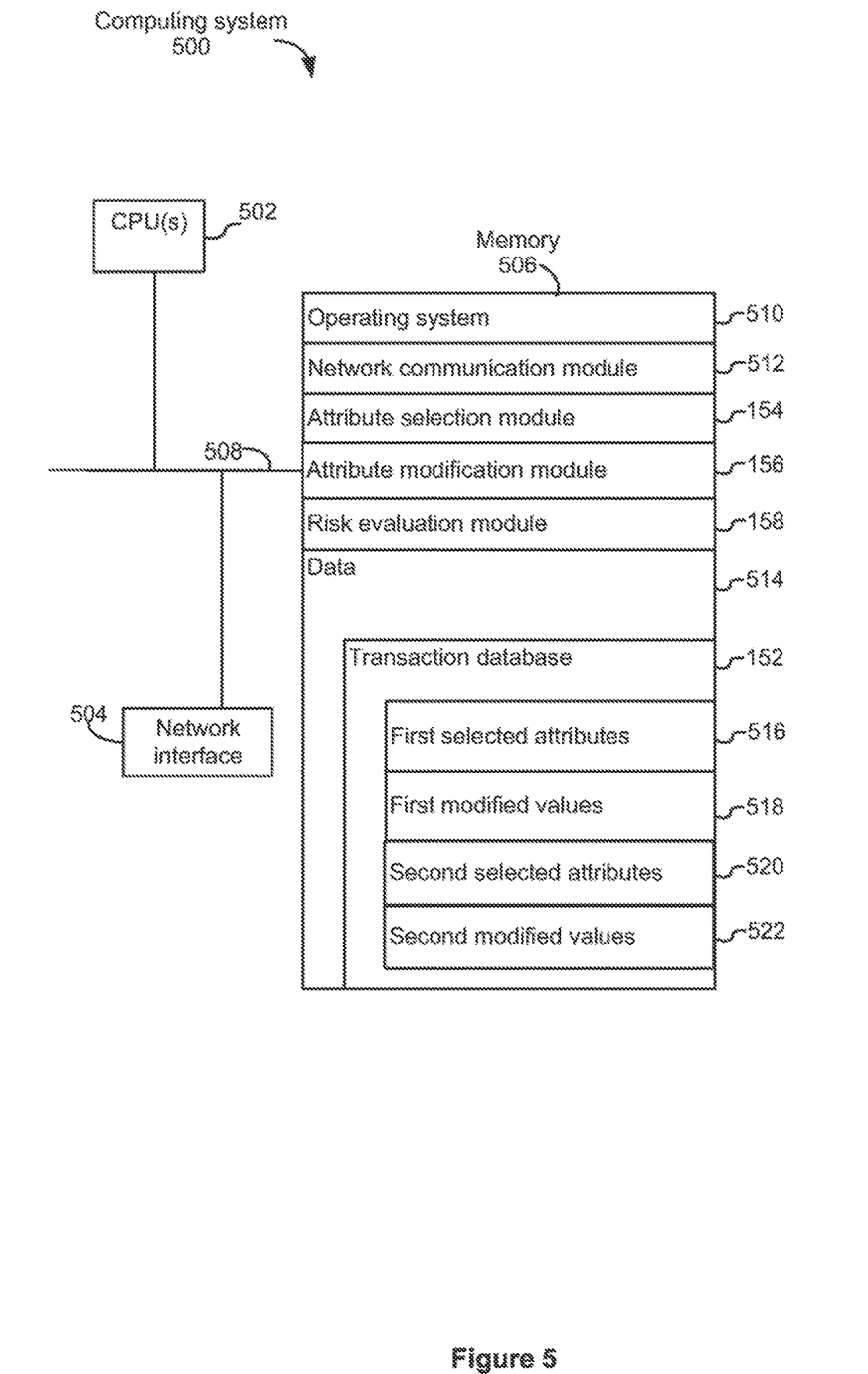
FIG. 5 is a schematic view illustrating an embodiment of a computing system.

FIG. 5 is a schematic view illustrating an embodiment of a computing system 500, which can be the computing system 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

an operating system 510, which includes procedures for handling various basic system services and for performing hardware dependent tasks;

a network communication module (or instructions) 512 for connecting the system 500 with other devices (e.g., the user device 102 or the transaction device 108) via one or more network interfaces 504;

the attribute selection module 154 comparing transaction attributes of a user transaction with transaction attributes employed by a risk evaluation model and selecting a subset of the transaction attributes for risk evaluation, e.g., based on information associated with the user transaction or with the user profile 122;

the attribute modification module 156 for modifying values of transaction attributes selected by the attribute selection module 154 and providing the modified values to the risk evaluation module 156 for risk re-evaluation;

the risk evaluation module 158 for selecting a risk evaluation model based on information associated with a user transaction and determining or calculating the risk level of a user transaction based on the selected model; and data 514 stored on the system 500, which may include:
  a transaction database 156 (or a portion thereof) for storing one or more transaction attributes or values thereof, which may include:
    a first group of transaction attributes 516;
    a first group of modified values 518 of the transaction attributes 516;
    a second group of transaction attributes 520; and
    a second group of modified values 522 of the transaction attributes 520.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 506 optionally stores a subset of the modules and data structures identified above. Furthermore, the memory 506 may store additional modules and data structures not described above.

Although FIGS. 4 and 5 show a "user device 400" and a "computing system 500" and respectively, FIGS. 4 and 5 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer system, comprising:
   a processor; and
   a non-transitory computer-readable medium having stored thereon instructions that are executable to cause the computer system to perform operations comprising:
   receiving information indicating a request to perform an electronic transaction between a user of a user device and a merchant associated with a merchant device, wherein the request comprises a plurality of attribute values corresponding to a plurality of transaction attributes associated with the electronic transaction;
   determining, using a risk evaluation model, that the request is associated with a first risk above a predefined amount, wherein the risk evaluation model indicates that the request should be denied based on the first risk being above the predefined amount;
   determining, using the risk evaluation model, at least a specific machine learning attribute from a set of machine learning attributes, wherein a specific value for the specific machine learning attribute contributes to the first risk being above the predefined amount based on a plurality of modified transaction requests, wherein the plurality of modified transaction requests are generated by modifying different ones of the plurality of transaction attributes associated with the electronic transaction;
   generating an indication that the request is denied based on the specific machine learning attribute; and
   transmitting, to the user of the user device, response information including the indication that the request is denied based on the specific machine learning attribute.

2. The computer system of claim 1, wherein the operations further comprise:
   receiving, from the user via the user device, additional information regarding the specific machine learning attribute; and
   processing the electronic transaction based on the additional information.

3. The computer system of claim 1, wherein the operations further comprise:
   transmitting the indication that the request is denied to the user device.

4. The computer system of claim 1, wherein the operations further comprise:
   generating the plurality of modified transaction requests based on a first selected subset of the set of machine learning attributes.

5. The computer system of claim 1, wherein the information indicating the request to perform the electronic transaction is received via the merchant device.

6. The computer system of claim 1, wherein the plurality of transaction attributes comprise a user transaction frequency level.

7. A method, comprising:
   receiving, at a computer system, information indicating a request to perform an electronic transaction between a user of a user device and a merchant associated with a merchant device, wherein the request comprises a plurality of attribute values corresponding to a plurality of transaction attributes associated with the electronic transaction;
   determining, by the computer system using a risk evaluation model, that the request is associated with a first risk above a predefined amount, wherein the risk evaluation model indicates that the request should be denied based on the first risk being above the predefined amount;
   determining, by the computer system using the risk evaluation model, at least a specific machine learning attribute from a set of machine learning attributes, wherein a specific value for the specific machine learning attribute contributes to the first risk being above the predefined amount based on a plurality of modified transaction requests, wherein the plurality of modified transaction requests are generated by modifying different ones of the plurality of transaction attributes associated with the electronic transaction;

generating an indication that the request is denied based on the specific machine learning attribute; and transmitting, to the user of the user device, response information including the indication that the request is denied based on the specific machine learning attribute.

8. The method of claim 7, wherein the plurality of transaction attributes includes an IP address attribute, and wherein the specific value for the specific machine learning attribute comprises a specific IP address associated with the user device.

9. The method of claim 7, wherein the plurality of transaction attributes includes a purchase amount attribute, and wherein the specific value for the specific machine learning attribute comprises a specific purchase amount corresponding to the request.

10. The method of claim 7, wherein the plurality of transaction attributes includes a description attribute of an item being purchased, and wherein the specific value for the specific machine learning attribute comprises a specific item description corresponding to the request.

11. The method of claim 7, further comprising:
receiving, from the user via the user device, additional information regarding the specific machine learning attribute; and
processing the electronic transaction based on the additional information.

12. The method of claim 7, further comprising:
transmitting the indication that the request is denied to the user device.

13. The method of claim 7, further comprising:
generating the plurality of modified transaction requests based on a first selected subset of the set of machine learning attributes.

14. The method of claim 7, further comprising, wherein the information indicating the request to perform the electronic transaction is received via the merchant device.

15. A non-transitory computer-readable medium having stored thereon instructions that are executable to cause a computer system to perform operations comprising:
receiving information indicating a request to perform an electronic transaction between a user of a user device and a merchant associated with a merchant device, wherein the request comprises a plurality of attribute values corresponding to a plurality of transaction attributes associated with the electronic transaction;
determining, using a risk evaluation model, that the request is associated with a first risk above a predefined amount, wherein the risk evaluation model indicates that the request should be denied based on the first risk being above the predefined amount;
determining, using the risk evaluation model, at least a specific machine learning attribute from a set of machine learning attributes, wherein a specific value for the specific machine learning attribute contributes to the first risk being above the predefined amount based on a plurality of modified transaction requests, wherein the plurality of modified transaction requests are generated by modifying different ones of the plurality of transaction attributes associated with the electronic transaction;
generating an indication that the request is denied based on the specific machine learning attribute; and
transmitting, to the user of the user device, response information including the indication that the request is denied based on the specific machine learning attribute.

16. The non-transitory computer-readable medium of claim 15, wherein the operations further comprise:
receiving, via the user device, additional information regarding the specific machine learning attribute; and
processing the electronic transaction based on the additional information.

17. The non-transitory computer-readable medium of claim 15, wherein the operations further comprise:
transmitting the indication that the request is denied to the user device.

18. The non-transitory computer-readable medium of claim 15, wherein the operations further comprise:
generating the plurality of modified transaction requests based on a first selected subset of the set of machine learning attributes.

19. The non-transitory computer-readable medium of claim 15, wherein the plurality of transaction attributes comprise multiple transaction attributes corresponding to network address information for the user device.

20. The non-transitory computer-readable medium of claim 16, wherein the operations further comprise:
transmitting, to the user device, a notification indicating the processing of the electronic transaction based on a user-initiated contact made by the user of the user device subsequent to the user receiving the indication that the request is denied based on the specific machine learning attribute.

* * * * *